(12) United States Patent
Bano et al.

(10) Patent No.: US 10,427,104 B2
(45) Date of Patent: Oct. 1, 2019

(54) DOUBLE CROSSLINKED SODIUM ALGINATE/POLYVINYL ALCOHOL COMPOSITE NANOFILTRATION MEMBRANE AND PREPARATION METHOD THEREOF

(71) Applicant: KOREA RESEARCH INSTITUTE OF CHEMICAL TECHNOLOGY, Daejeon (KR)

(72) Inventors: Saira Bano, Lahore (PK); Asif Mahmood, Daejeon (KR); Seong-Joong Kim, Daejeon (KR); Kew Ho Lee, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 574 days.

(21) Appl. No.: 15/064,317

(22) Filed: Mar. 8, 2016

(65) Prior Publication Data
US 2016/0339395 A1 Nov. 24, 2016

(30) Foreign Application Priority Data
May 20, 2015 (KR) .................. 10-2015-0070224

(51) Int. Cl.
*B01D 69/12* (2006.01)
*B01D 67/00* (2006.01)
(Continued)

(52) U.S. Cl.
CPC ....... *B01D 69/125* (2013.01); *B01D 67/0006* (2013.01); *C02F 1/442* (2013.01);
(Continued)

(58) Field of Classification Search
CPC .. B01D 69/125; B01D 67/0006; B01D 71/38; B01D 71/08; B01D 2323/30; B01D 61/027; C02F 1/442
See application file for complete search history.

(56) References Cited

FOREIGN PATENT DOCUMENTS

KR 101487764 1/2015

OTHER PUBLICATIONS

Bano et al., Chlorine resistant binary complexed NaAlg/PVA composite membrane for nanofiltration, 2014, Separation and Purification Technology, 137, pp. 21-27 (Year: 2014).*

(Continued)

*Primary Examiner* — Taiwo Oladapo
(74) *Attorney, Agent, or Firm* — Duane Morris LLP; Gregory M. Lefkowitz; Jason M. Nolan

(57) ABSTRACT

Provided is a double crosslinked sodium alginate/polyvinyl alcohol composite nanofiltration membrane, including: a porous polymer support; and a sodium alginate/polyvinyl alcohol blend coating layer formed on the porous polymer support and having a first crosslinking structure formed by complexation with divalent metal ions and a second crosslinking structure formed by acetalization with aldehyde groups. The double crosslinked sodium alginate/polyvinyl alcohol composite nanofiltration membrane disclosed herein not only shows excellent chlorine resistance but also has improved water permeation flux and salt rejection ratio, and thus may be manufactured in the form of a spirally wound type membrane module and applied to a water treatment system in which it may be utilized for an actual nanofiltration separation process.

20 Claims, 5 Drawing Sheets

(51) Int. Cl.
*C02F 1/44* (2006.01)
*B01D 61/02* (2006.01)
*B01D 71/08* (2006.01)
*B01D 71/38* (2006.01)

(52) U.S. Cl.
CPC ............ *B01D 61/027* (2013.01); *B01D 71/08* (2013.01); *B01D 71/38* (2013.01); *B01D 2323/30* (2013.01)

(56) References Cited

OTHER PUBLICATIONS

Xie et al., Preparation and characterization of PVA-MSA/mCS bipolar membrane , 2013, Advanced Materials Research, 634-638, 2336-2341, 7 pp. (Year: 2013).*

Immelman, E., et al., "Poly(vinyl alcohol) Gel Sublayers for Reverse Osmosis Membranes. 1. Insolubilization by Acid-Catalyzed Dehydration," Journal of Applied Polymer Science, 1993, vol. 50, pp. 1013-1034.

Jegal, J., et al., "Characteristics of the Nanofiltration Composite Membranes Based on PVA and Sodium Alginate," Journal of Applied Polymer Science, 2001, vol. 79, pp. 2471-2479.

* cited by examiner

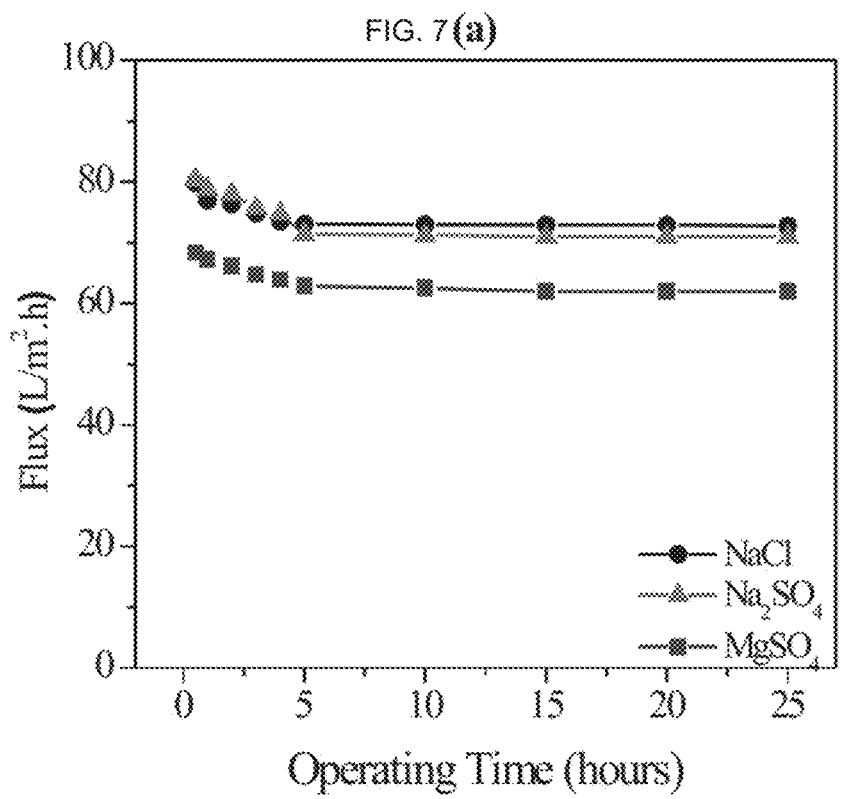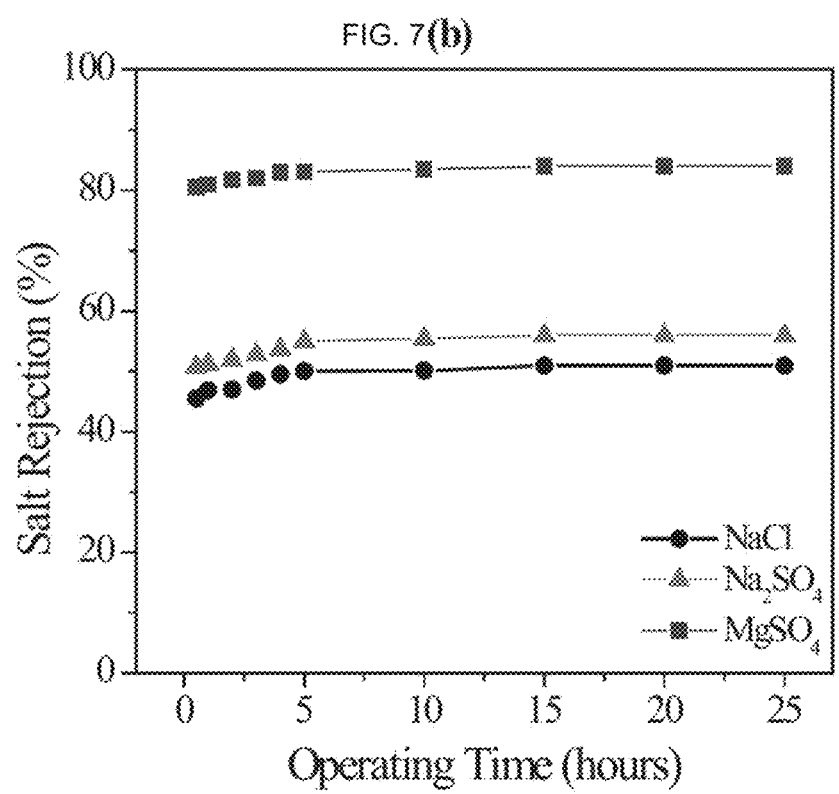

DOUBLE CROSSLINKED SODIUM ALGINATE/POLYVINYL ALCOHOL COMPOSITE NANOFILTRATION MEMBRANE AND PREPARATION METHOD THEREOF

CROSS-REFERENCE TO RELATED APPLICATIONS

This application claims priority under 35 U.S.C. § 119 to Korean Patent Application No. 10-2015-0070224 filed on May 20, 2015 in the Korean Intellectual Property Office, the disclosure of which is incorporated herein by reference in its entirety.

TECHNICAL FIELD

The following disclosure relates to a double crosslinked sodium alginate/polyvinyl alcohol composite nanofiltration membrane and a method for preparing the same. More particularly, the following disclosure relates to preparation of a double crosslinked sodium alginate/polyvinyl alcohol composite nanofiltration membrane including a porous polymer support coated with a sodium alginate/polyvinyl alcohol blend having a double crosslinked structure, and application thereof to water treatment industry.

BACKGROUND

Recently, many attentions have been given to nanofiltration membranes in the field of water purification technology which essentially requires complete removal of dye materials from industrial waste water or securement of stable supply of public drinking water using, as crude water, surface water or groundwater from which agricultural chemicals or other organic contaminants are to be removed. Such nanofiltration membranes are those positioned in the middle of reverse osmosis membranes and ultrafiltration membranes based on the classification according to pore sizes. Such nanofiltration membranes are driven under a lower pressure condition as compared to a reverse osmosis membrane process and allow filtration of a part of salts, including organic materials. Thus, a nanofiltration membrane process is also referred to as a low-pressure reverse osmosis membrane process in its nature. In other words, since the purity of water produced after filtration does not show a fineness corresponding to ultrapure water required for a semiconductor process or pharmaceutical industry, nanofiltration membranes are used for some applications not requiring a high-efficiency reverse osmosis process obstinately.

Active studies have been conducted about development of nanofiltration membranes having excellent water permeability and a high salt rejection ratio to meet such applications. The inventors of the present disclosure have already developed a polyamide-based composite membrane having a salt rejection ratio required for the field of nanofiltration membranes or reverse osmosis membranes and high water permeability at the level of nanofiltration, and have registered it as patent. Such a composite membrane may increase throughput per unit time and provide increased efficiency during a water treatment process, resulting in high cost efficiency. However, due to the characteristics of such a polyamide-based composite membrane, it shows low chlorine resistance and is susceptible to fouling. Therefore, actual application of the polyamide-based composite membrane to large-scale water treatment industry is limited (Patent Document 1).

In addition, to solve the problem of the polyamide-based composite membrane having low chemical stability, such as chlorine resistance, some studies have been conducted about a nanofiltration composite membrane including hydrophilic alcohol having a chemically stable C—C single bond backbone as an active layer. However, the polyvinyl alcohol active layer has a relatively large thickness and an inadequate crosslinking degree, resulting in a relatively low water permeation flux and salt rejection ratio (Non-Patent Document 1).

Meanwhile, to solve the above-mentioned problems, there has been developed a single crosslinked sodium alginate/polyvinyl alcohol composite membrane for nanofiltration having improved membrane density through the crosslinking with glutaraldehyde alone. However, in this case, it is required to pretreat the polysulfone support used in the composite membrane with a monomer material, piperazine and trimesoyl chloride, in order to reduce the pore size of the polysulfone support and to improve hydrophilicity. In addition, such a composite membrane is not optimized for improvement of a water permeation flux simultaneously with a salt rejection ratio (Non-Patent Document 2).

Therefore, the inventors of the present disclosure have conducted many studies and prepared a double crosslinked sodium alginate/polyvinyl alcohol composite membrane by coating a porous polymer support, such as polysulfone, with a sodium alginate/polyvinyl alcohol blend without a pretreatment process of the porous polymer support and then carrying out crosslinking by using two types of crosslinking agents having a different crosslinking mechanism to improve membrane density. We have found that the composite membrane shows excellent chemical stability, such as chlorine resistance, and has an increased water permeation flux as well as an increased salt rejection ratio, when applied to nanofiltration. The present disclosure is based on this finding.

REFERENCES

Patent Document

Patent Document 1. Korean Patent Publication No. 10-1487764

Non-Patent Document

Non-Patent Document 1. Immelman, E. et al., *J. Appl. Polym. Sci* 50, 1013-1034(1993)

Non-Patent Document 2. Jonggeon Jegal et al., *J. Appl. Polym. Sci* 79, 2471-2479(2001)

SUMMARY

An embodiment of the present disclosure is directed to providing a double crosslinked sodium alginate/polyvinyl alcohol composite nanofiltration membrane that shows excellent chlorine resistance and has an improved water permeation flux and salt rejection ratio at the same time, and a method for preparing the same.

In one aspect, there is provided a double crosslinked sodium alginate/polyvinyl alcohol composite nanofiltration membrane, including: a porous polymer support; and a sodium alginate/polyvinyl alcohol blend coating layer formed on the porous polymer support and having a first crosslinking structure formed by complexation with divalent metal ions and a second crosslinking structure formed by acetalization with aldehyde groups.

According to an embodiment, the porous polymer support may be any one selected from the group consisting of polysulfone, polyethersulfone, polyacrylonitrile, polyamide, polyimide, polyetherimide, polyetherether ketone, polyvinylidene fluoride, cellulose acetate and cellulose triacetate.

According to another embodiment, the divalent metal ion may be any one selected from the group consisting of $Ca^{2+}$, $Mg^{2+}$, $Cu^{2+}$, $Zn^{2+}$, $Fe^{2+}$, $Mn^{2+}$, $Co^{2+}$, $Ni^{2+}$, $Sn^{2+}$ and $Ti^{2+}$.

According to still another embodiment, the blend of sodium alginate/polyvinyl alcohol includes 20-90 wt % of sodium alginate and 10-80 wt % of polyvinyl alcohol.

According to yet another embodiment, the coating layer of sodium alginate/polyvinyl alcohol blend has a thickness of 0.85-1 μm.

In another aspect, there is provided a method for preparing a double crosslinked sodium alginate/polyvinyl alcohol composite nanofiltration membrane, including the steps of: I) coating a porous polymer support with an aqueous solution of sodium alginate/polyvinyl alcohol to form a composite membrane on the support; II) dipping the resultant composite membrane into a solution containing divalent metal ions to carry out primary crosslinking; and III) washing the primarily crosslinked composite membrane, and then dipping it into an aqueous glutaraldehyde solution to carry out secondary crosslinking.

According to an embodiment, the aqueous solution of sodium alginate/polyvinyl alcohol blend has a concentration of 0.1-0.5 wt %.

According to another embodiment, the primary crosslinking may be carried out for 10-220 minutes.

In still another aspect, there is provided a spirally wound type membrane module including the double crosslinked sodium alginate/polyvinyl alcohol composite nanofiltration membrane.

In yet another aspect, there is provided a water treatment system including the spirally wound type membrane module.

The double crosslinked sodium alginate/polyvinyl alcohol composite nanofiltration membrane according to the present disclosure not only shows excellent chlorine resistance but also has an improved water permeation flux and salt rejection ratio, and thus may be manufactured in the form of a spirally wound type membrane module and applied to a water treatment system in which it may be utilized for an actual nanofiltration separation process.

BRIEF DESCRIPTION OF THE DRAWINGS

FIG. 7A is a graph illustrating the water permeation flux characteristics of the double crosslinked sodium alginate/polyvinyl alcohol composite nanofiltration membrane according to Example 1 for various salt solutions as a function of operating time (operation conditions: 15° C., 225 psi).

FIG. 7B is a graph illustrating the salt rejection characteristics of the double crosslinked sodium alginate/polyvinyl alcohol composite nanofiltration membrane according to Example 1 for various salt solutions as a function of operating time (operation conditions: 15° C., 225 psi).

DETAILED DESCRIPTION OF EMBODIMENTS

Figure 1:
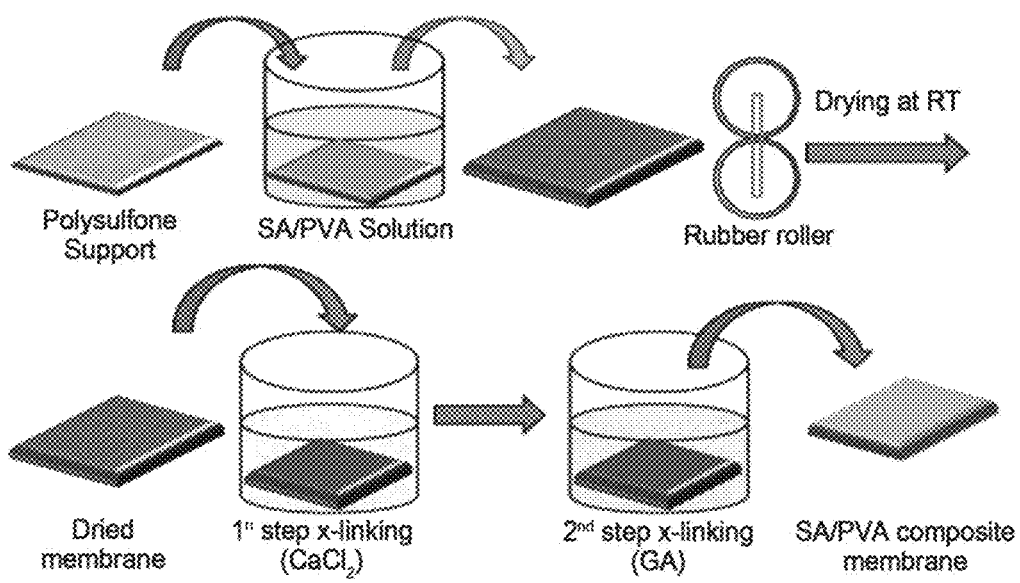
FIG. 1 is a schematic view illustrating a process for preparing the double crosslinked sodium alginate/polyvinyl alcohol composite nanofiltration membrane according to an embodiment.

The advantages, features and aspects of the double crosslinked sodium alginate (NaAlg)/polyvinyl alcohol (PVA) composite nanofiltration membrane and the method for preparing the same according to the present disclosure will become apparent from the following description of the embodiments with reference to the accompanying drawings, which is set forth hereinafter.

In one aspect, there is provided a double crosslinked sodium alginate/polyvinyl alcohol composite nanofiltration membrane, including: a porous polymer support; and a sodium alginate/polyvinyl alcohol blend coating layer formed on the porous polymer support and having a first crosslinking structure formed by complexation with divalent metal ions and a second crosslinking structure formed by acetalization with aldehyde groups.

The porous polymer support functions as a support for an active layer so that the double crosslinked sodium alginate/polyvinyl alcohol composite nanofiltration membrane may resist high pressure when applied to the process industry requiring water treatment, and thus requires excellent mechanical properties. Particularly, a vitreous hydrophobic polymer material having high attraction force between polymer chains may be used as the porous polymer support. More particularly, as the porous polymer support, it is possible to use any one selected from the group consisting of polysulfone, polyethersulfone, polyacrylonitrile, polyamide, polyimide, polyetherimide, polyetherether ketone, polyvinylidene fluoride, cellulose acetate and cellulose triacetate. Preferably, commercialized polysulfone or polyethersulfone may be used.

According to the related art, preparation of a composite membrane requires a pretreatment step in which a polysulfone support is pretreated with a monomeric material, such as piperazine or trimesoylchloride, in order to reduce the pore size of polysulfone which is one of the porous polymer supports and to improve hydrophilicity thereof. However, according to the present disclosure, such a pretreatment step is not required and a commercialized porous polymer support is used as it is.

The sodium alginate/polyvinyl alcohol blend coating layer is formed on the porous polymer support and has a first crosslinking structure formed by complexation with divalent metal ions and a second crosslinking structure formed by acetalization with aldehyde groups. The divalent metal ion may be any one selected from the group consisting of $Ca^{2+}$, $Mg^{2+}$, $Cu^{2+}$, $Zn^{2+}$, $Fe^{2+}$, $Mn^{2+}$, $Co^{2+}$, $Ni^{2+}$, $Sn^{2+}$ and $Ti^{2+}$. It reacts with the carboxyl groups of sodium alginate to form a complex, thereby forming a first crosslinking structure. Herein, the above-listed divalent metal ions may be derived from a solution of divalent metal salt, such as $CaCl_2$, but is not limited thereto.

In addition, the hydroxyl groups (—OH) of sodium alginate and polyvinyl alcohol react with aldehyde groups to form acetal, thereby forming a secondary crosslinking structure. As an aldehyde group-containing compound, glutaraldehyde is used preferably.

Thus, the double crosslinking structure according to the present disclosure is obtained through the formation the first crosslinking structure in combination with the second crosslinking structure on the porous polymer support by using the sodium alginate/polyvinyl alcohol blend.

Particularly, the sodium alginate/polyvinyl alcohol blend includes 20-90 wt % of sodium alginate and 10-80 wt % of polyvinyl alcohol. Considering the trade-off relationship between a water permeation flux and salt rejection ratio, the amount of each ingredient in the sodium alginate/polyvinyl alcohol blend is controlled within the above-defined range.

In addition, the coating layer of sodium alginate/polyvinyl alcohol blend has a thickness of 0.85-1 μm. When the coating layer has a thickness less than 0.85 μm, it is too thin to function as an active layer, resulting in an increase in water permeation flux but a significant decrease in salt rejection ratio. When the coating layer has a thickness larger than 1 μm, the salt rejection ratio may increase slightly but the water permeation flux decreases significantly.

In another aspect, there is provided a method for preparing a double crosslinked sodium alginate/polyvinyl alcohol composite nanofiltration membrane, including the steps of:
I) coating a porous polymer support with an aqueous solution of sodium alginate/polyvinyl alcohol to a porous polymer support to form a composite membrane on the support;
II) dipping the resultant composite membrane into a solution containing divalent metal ions to carry out primary crosslinking; and III) washing the primarily crosslinked composite membrane, and then dipping it into an aqueous glutaraldehyde solution to carry out secondary crosslinking.

As described above, the porous polymer support may be any one selected from the group consisting of polysulfone, polyethersulfone, polyacrylonitrile, polyamide, polyimide, polyetherimide, polyetherether ketone, polyvinylidene fluoride, cellulose acetate and cellulose triacetate. Particularly, commercialized polysulfone or polyethersulfone may be used.

The aqueous solution of sodium alginate/polyvinyl alcohol blend preferably has a concentration of 0.1-0.5 wt %. The concentration of aqueous blend solution is related directly with the thickness of the coating layer formed on the porous polymer support. When the concentration of the aqueous blend solution is less than 0.1 wt %, the thickness of the coating layer functioning as an active layer is excessively small, thereby causing an increase in water permeation flux but significant degradation of salt rejection ratio. When the concentration of the aqueous blend solution is larger than 0.5 wt %, the thickness of the coating layer is excessively large, resulting in significant degradation of water permeation flux as compared to an increase in salt rejection ratio.

In addition, in step II), the composite membrane including the coating layer of sodium alginate/polyvinyl alcohol blend formed on the porous polymer support is dipped into a solution containing divalent metal ions to carry out primary crosslinking. As the solution containing divalent cations, a divalent metal salt solution including any one selected from the group consisting of $Ca^{2+}$, $Mg^{2+}$, $Cu^{2+}$, $Zn^{2+}$, $Fe^{2+}$, $Mn^{2+}$, $Co^{2+}$, $Ni^{2+}$, $Sn^{2+}$ and $Ti^{2+}$ is preferred, and the divalent metal salt reacts with carboxyl groups of sodium alginate to form a primary crosslinking structure. Herein, the reaction time required for forming the primary crosslinking structure is controlled to 10-220 minutes in order to minimize the trade-off relationship between a water permeation flux and salt rejection ratio.

Then, in step III), the composite membrane having the primary crosslinking structure is washed and then dipped into an aqueous glutaraldehyde solution to carry out secondary crosslinking. According to the related studies of the present inventors, it is reported that the optimum reaction time for crosslinking between glutaraldehyde and sodium alginate/polyvinyl alcohol blend is 20 minutes (see, Non-Patent Document 2 mentioned in the above BACKGROUND part). Thus, it is preferred that the reaction time for the secondary crosslinking carried out by dipping the composite membrane having the primary crosslinking structure into aqueous glutaraldehyde solution is controlled to 20 minutes.

In still another aspect, there is provided a spirally wound type membrane module including the double crosslinked sodium alginate/polyvinyl alcohol composite nanofiltration membrane. The spirally wound type membrane module is applied to a water treatment system in which it may be utilized for an actual nanofiltration separation process.

The examples and experiments will now be described with reference to the accompanying drawings.

EXAMPLE 1

Preparation of Double Crosslinked NaAlg/PVA Composite Nanofiltration Membrane

First, a commercialized porous polysulfone support (Psf) is prepared, and 0.3 wt % of sodium alginate (NaAlg) and polyvinyl alcohol (PVA) are dissolved into deionized water to obtain an aqueous solution. Then, an aqueous solution of sodium alginate (NaAlg)/polyvinyl alcohol (PVA) (weight ratio 80/20) blend is agitated well and debubbled, and applied to the porous polysulfone support through dip coating, followed by drying at room temperature, to obtain a composite membrane. Then, the dried composite membrane is dipped into 5 wt % calcium chloride ($CaCl_2$) solution for 120 minutes to carry out primary crosslinking. Subsequently, the composite membrane that has undergone primary crosslinking is washed with deionized water and dipped into 5 wt % aqueous glutaraldehyde (GA) solution for 20 minutes to carry out secondary crosslinking. Finally, the composite membrane that has undergone primary crosslinking and secondary crosslinking is washed repeatedly with deionized water to remove the unreacted materials, thereby providing a double crosslinked sodium alginate (NaAlg)/polyvinyl alcohol (PVA) composite nanofiltration membrane.

EXAMPLES 2-4

Preparation of Double Crosslinked NaAlg/PVA Composite Nanofiltration Membrane

Double crosslinked sodium alginate (NaAlg)/polyvinyl alcohol (PVA) composite nanofiltration membranes are obtained in the same manner as Example 1, except that the weight ratio of aqueous sodium alginate (NaAlg)/polyvinyl alcohol (PVA) blend is set to 90/10 (Example 2), 50/50 (Example 3) or 20/80 (Example 4).

Figure 2:
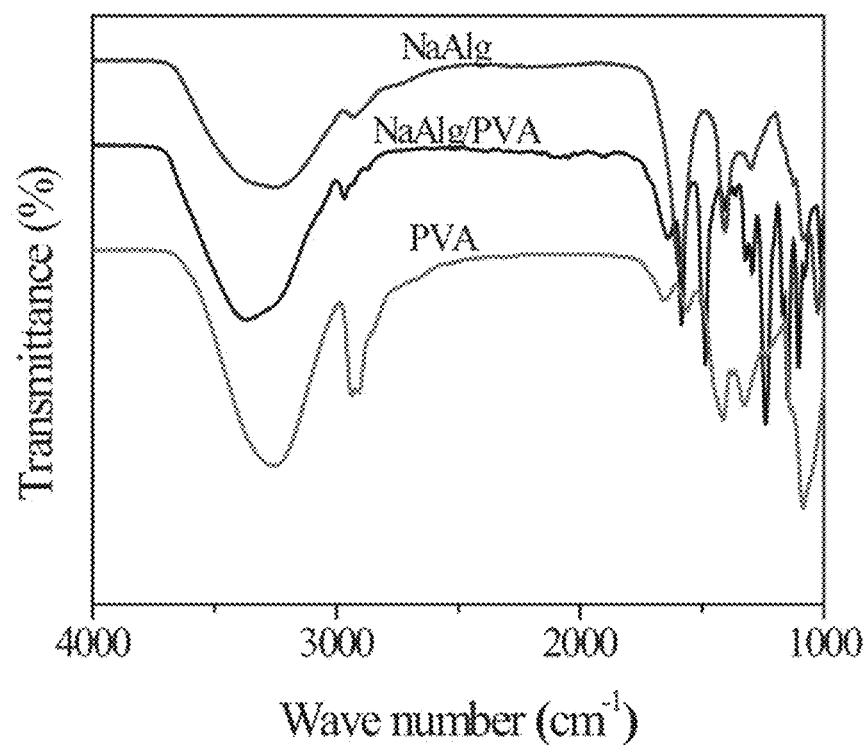
FIG. 2 shows the spectrum of each of the double crosslinked sodium alginate/polyvinyl alcohol composite nanofiltration membrane (NaAlg/PVA) according to Example 1, and the control group of a sodium alginate (NaAlg) membrane and polyvinyl alcohol (PVA) membrane, as determined by Fourier Transform Infrared Spectroscopy (FTIR).

FIG. 1 is a schematic view illustrating a process for preparing the double crosslinked sodium alginate/polyvinyl alcohol composite nanofiltration membrane according to an embodiment. FIG. 2 shows the spectrum of each of the double crosslinked sodium alginate/polyvinyl alcohol composite nanofiltration membrane (NaAlg/PVA) according to Example 1 as shown in the schematic view, and the control group of a sodium alginate (NaAlg) membrane and polyvinyl alcohol (PVA) membrane, as determined by Fourier Transform Infrared Spectroscopy (FTIR). As shown in FIG. 2, the pure PVA membrane shows a broad band corresponding to stretching vibration of hydroxyl (—OH) groups at 3100-3500 $cm^{-1}$. On the contrary, the NaAlg/PVA composite membrane shows a strong absorption band at 3376 $cm^{-1}$. This band results from the hydroxyl groups forming hydrogen bonding. The lack of a sharp free peak at 3600-3500 $cm^{-1}$ suggests that (free) non-hydrogen bonded hydroxyl groups are not present. In the case of the pure PVA membrane, a medium-intensity peak appears at 2900-3000 $cm^{-1}$, and the peak shows decreased intensity in the case of the spectrum of the composite membrane. This peak results from the hydrogen bonded hydroxyl groups and C—H stretching vibration. In the case of the composite membrane, a very weak absorption peak appears at 2968 $cm^{-1}$, and the peak results from $sp^3$ hybridized C—H stretching vibration. As expected, two peaks are observed at 1640 $cm^{-1}$ and 1585 $cm^{-1}$. This suggest that two different types of —C═O groups are present in the composite membrane. In the case of the pure NaAlg membrane, a strong absorption peak appears at 1590 $cm^{-1}$ due to C═O stretching vibration of alginate salt and is a characteristic peak of ionically bonded carboxyl groups of alginate salt. In the case of the composite membrane, a similar peak appears but it has decreased intensity. The peak at 1640 $cm^{-1}$ results from —C═O groups of ester or acetal, which suggests that the membrane is crosslinked with calcium ions and glutaraldehyde. In fact, carboxyl groups of NaAlg are crosslinked with divalent calcium ions and hydroxyl groups of NaAlg and PVA are crosslinked with glutaraldehyde to form acetal. In addition, the weak —C═O absorption peak at 1640 $cm^{-1}$ results from a small proportion of PVA in the membrane. The peak appearing at 1486 $cm^{-1}$ results from bending vibration of C—H bonds. Since most membranes containing NaAlg have a cyclic ether bond, a strong and sharp band is observed at 1237 $cm^{-1}$. The two different C—O stretching vibration peaks at 1149 $cm^{-1}$ and 1104 $cm^{-1}$ suggest that C—O—C groups and C—O—H groups are present. Therefore, it can be seen from the FTIR spectrum of FIG. 2 that NaAlg and PVA are mixed completely through the two-step crosslinking process.

Figure 3A:
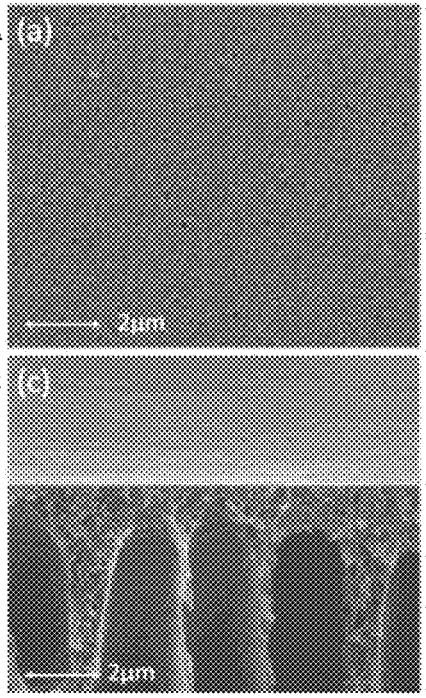
FIG. 3A shows the scanning electron microscopic (SEM) images of a surface of the control group of a polysulfone support (Psf).
Figure 3B:
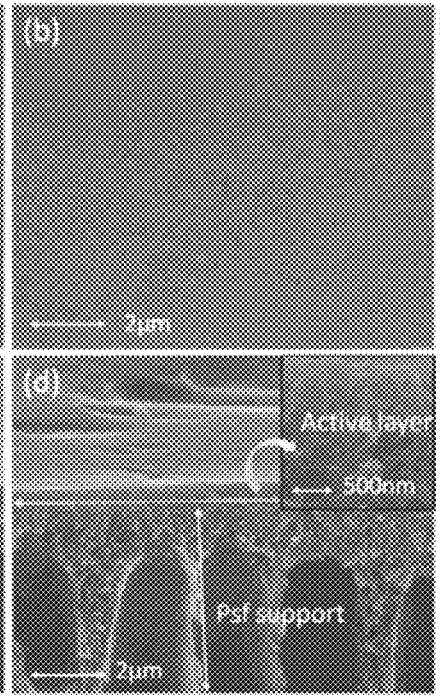
FIG. 3B shows the scanning electron microscopic (SEM) images of a surface of the double crosslinked sodium alginate/polyvinyl alcohol composite nanofiltration membrane according to Example 1.
Figure 3C:
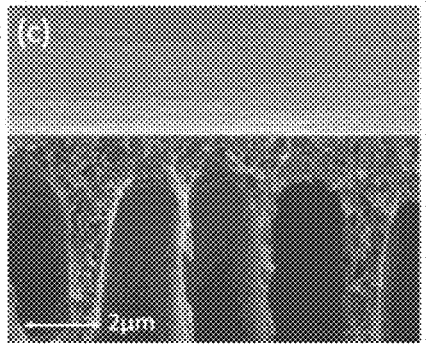
FIG. 3C shows the scanning electron microscopic (SEM) images of a section of the control group of a polysulfone support (Psf).
Figure 3D:
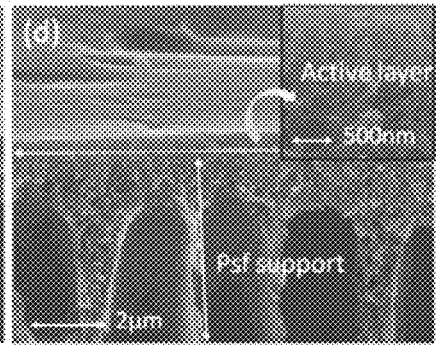
FIG. 3D shows the scanning electron microscopic (SEM) images of a section of the double crosslinked sodium alginate/polyvinyl alcohol composite nanofiltration membrane according to Example 1.

In addition, FIG. 3A shows the scanning electron microscopic (SEM) images of the surface of the control group of a polysulfone support (Psf). FIG. 3B shows the scanning electron microscopic (SEM) images of the surface of the double crosslinked sodium alginate/polyvinyl alcohol composite nanofiltration membrane according to Example 1. FIG. 3C shows the scanning electron microscopic (SEM) images of the section of the control group of a polysulfone support (Psf). FIG. 3D shows the scanning electron microscopic (SEM) images of the section of the double crosslinked sodium alginate/polyvinyl alcohol composite nanofiltration membrane according to Example 1. It can be seen from FIG. 3D that the composite nanofiltration membrane has a very thin active layer having an average thickness of about 1 μm and a dense surface structure present on the finger-like structure of the polysulfone support layer. The thin active layer functions to control the water permeation flux and salt rejection characteristics of the composite nanofiltration membrane. It can be seen that an interconnected network is formed continuously inside the thin film having a uniform surface structure and is attached well to the polysulfone support.

In addition, the following Table 1 shows the filtering quality of the double crosslinked sodium alginate/polyvinyl alcohol composite nanofiltration membrane according to Example 1 as compared to that of the known nanofiltration membrane according to the related art.

TABLE 1

| Nanofiltration membrane | Crosslinking agent | Water permeation flux (L/$m^2 \cdot$ h) | Salt rejection ratio (%) | Reference |
| --- | --- | --- | --- | --- |
| Example 1[2] | $CaCl_2$/GA | 79 | 45 | — |
| NaAlg/Psf[1] | GA | 34 | 32 | a |
| PVA/Psf | SA | 32 | 35 | b |
| PVA/NaAlg/Psf[1,4] | GA | 52 | 16 | c |
| PVA/NaAlg/Psf[1] | GA | 31 | 13 | d |
| PVA[1,3] | GA | 8 | 68 | e |
| PVA/NaAlg[1,3] | GA | 6 | 70 | e |

GA: glutaraldehyde,
SA: succinic acid,
[1]feed: 1000 ppm,
[2]feed: 2000 ppm,
[3]dense membrane,
[4]pretreated Psf support
a: J. Appl. Polym. Sci., 77, 347(2000)
b: Chem, Mater., 17, 6790(2005)
c: J. Appl. Polym. Sci., 72, 1755(1999)
d: J. Appl. Polym. Sci., 79, 2471(2001)
e: J. Appl. Polym. Sci., 61, 389(1996)

In general, it is known that NaAlg-based membranes have a lower water permeation flux and a higher salt rejection ratio as compared to PVA/NaAlg composite membranes.

However, the results of Table 1 are somewhat inconsistent with this. It is thought that such results are caused by a difference in membrane thickness, crosslinking agent and operating conditions. The water permeation flux generally tends to decrease as the concentration of feed increases. Although the concentration of feed applied to the present disclosure is higher than the other cases listed in Table 1, the membrane according to the present disclosure has a higher water permeation flux and better permeation characteristics as compared to the known nanofiltration membranes.

Figure 4:
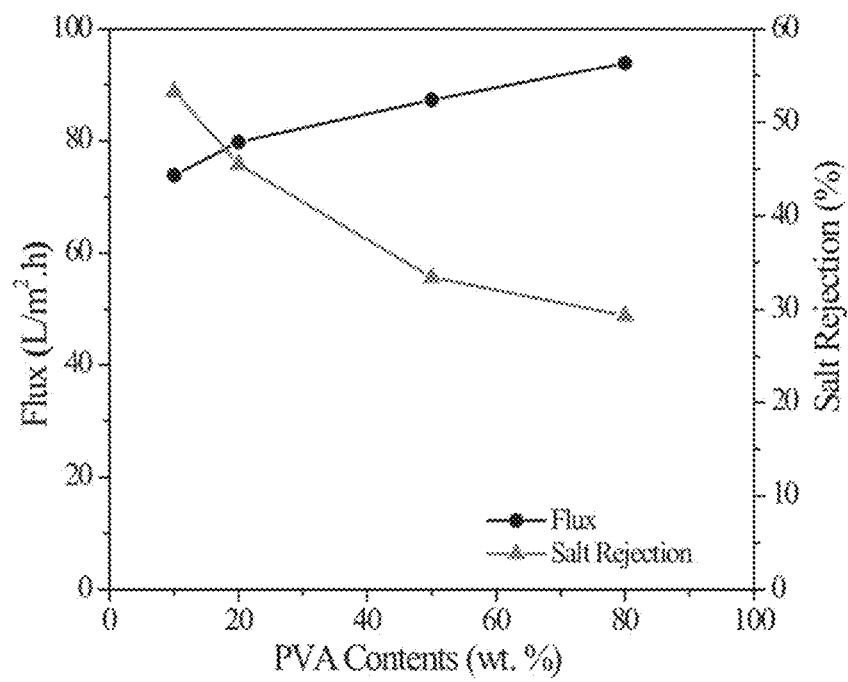
FIG. 4 is a graph illustrating the water permeation flux and salt rejection ratio characteristics of the double crosslinked sodium alginate/polyvinyl alcohol composite nanofiltration membranes according to Examples 1-4 (feed: 15° C., 225 psi, 2000 ppm sodium chloride solution).

In addition, FIG. 4 is a graph illustrating the water permeation flux and salt rejection ratio characteristics of the double crosslinked sodium alginate/polyvinyl alcohol composite nanofiltration membranes according to Examples 1-4 (feed: 15° C., 225 psi, 2000 ppm sodium chloride solution). The composition of a membrane plays an important role in its separation characteristics. As shown in FIG. 4, it can be seen that as the PVA content increases, the water permeation flux increases and the salt rejection ratio decreases. Such an increase in water permeation flux results from the high hydrophilicity of PVA and such a decrease in salt rejection ratio results from a relative decrease in NaAlg content and degradation of ionic characteristics of a membrane. Thus, when the sodium alginate content in a membrane increases, the repulsion force against multivalent ions increases and the salt rejection ratio decreases.

Figure 5:
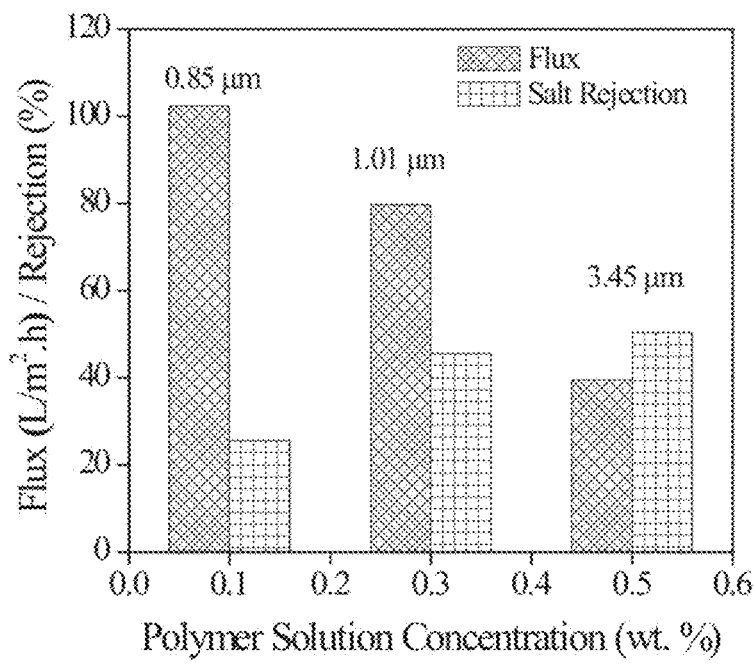
FIG. 5 is a graph illustrating the water permeation flux and salt rejection ratio characteristics of the double crosslinked sodium alginate/polyvinyl alcohol composite nanofiltration membrane as a function of concentration of aqueous solution of sodium alginate/polyvinyl alcohol blend, when the double crosslinked sodium alginate/polyvinyl alcohol composite nanofiltration membrane is prepared according to Example 1 (feed: 15° C., 225 psi, 2000 ppm sodium chloride solution).

In addition, FIG. 5 is a graph illustrating the water permeation flux and salt rejection ratio characteristics of the double crosslinked sodium alginate/polyvinyl alcohol composite nanofiltration membrane as a function of concentration of aqueous solution of sodium alginate/polyvinyl alcohol blend, when the double crosslinked sodium alginate/polyvinyl alcohol composite nanofiltration membrane is prepared according to Example 1 (feed: 15° C., 225 psi, 2000 ppm sodium chloride solution). Generally, in the case of a composite membrane, a thin active layer plays an important role in controlling the quality of the membrane. It is thought that a difference in thickness of an active layer results in different permeability. Thus, it is required to control the concentration or viscosity of aqueous sodium alginate/polyvinyl alcohol blend to obtain a desired thickness. As the thickness of an active layer (concentration of aqueous sodium alginate/polyvinyl alcohol blend) increases, the salt rejection ratio increases and water permeation flux decreases. When the concentration of aqueous sodium alginate/polyvinyl alcohol blend is low (0.1 wt %), an active layer having a very small thickness of 0.85 µm is formed, resulting in an increase in water permeation flux and a decrease in salt rejection ratio. In addition, when the concentration of aqueous sodium alginate/polyvinyl alcohol blend is increased from 0.1 wt % to 0.3 wt %, the thickness of an active layer becomes ~1 µm, resulting in a decrease in water permeation flux and an increase in salt rejection ratio. When the concentration of sodium alginate/polyvinyl alcohol blend is further increased to 0.5 wt %, the thickness increases significantly (3.45 µm), thereby affecting the water permeation flux and salt rejection characteristics of a composite membrane. Therefore, it can be seen from the results of FIG. 5 that when the concentration of sodium alginate/polyvinyl alcohol blend is 0.3 wt %, both water permeation flux and salt rejection characteristics are excellent.

Figure 6:
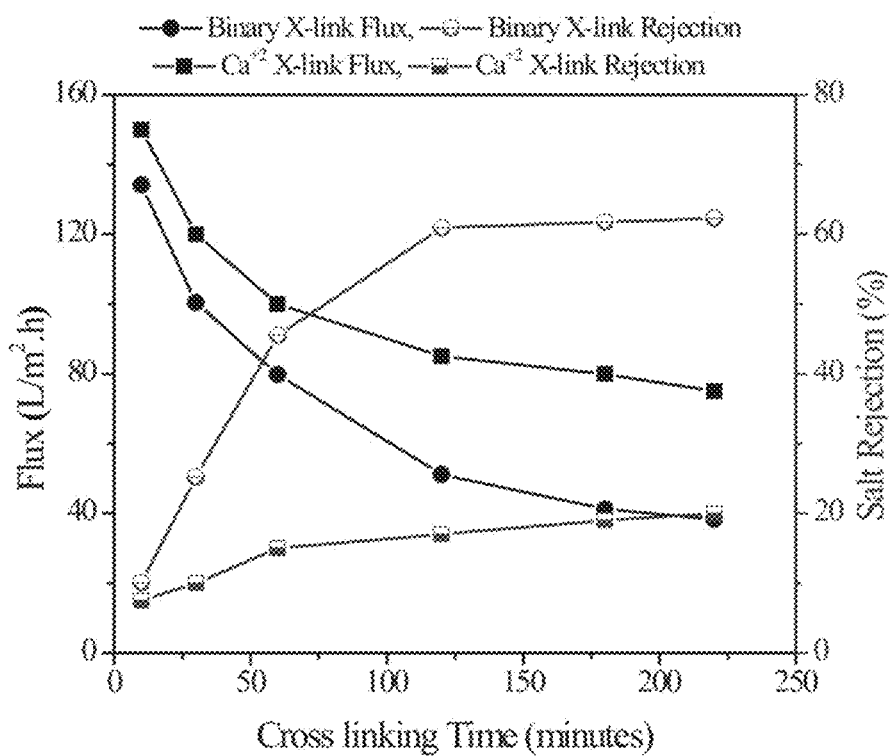
FIG. 6 is a graph illustrating the water permeation flux and salt rejection ratio characteristics of the double crosslinked sodium alginate/polyvinyl alcohol composite nanofiltration membrane as a function of reaction time for the primary crosslinking with $Ca^{2+}$ ions, when the double crosslinked sodium alginate/polyvinyl alcohol composite nanofiltration membrane is prepared according to Example 1 (feed: 15° C., 225 psi, 2000 ppm sodium chloride solution).

Further, FIG. 6 is a graph illustrating the water permeation flux and salt rejection ratio characteristics of the double crosslinked sodium alginate/polyvinyl alcohol composite nanofiltration membrane as a function of reaction time for the primary crosslinking with $Ca^{2+}$ ions (with the proviso that reaction time for the secondary crosslinking is the same and 20 minutes), when the double crosslinked sodium alginate/polyvinyl alcohol composite nanofiltration membrane is prepared according to Example 1 (feed: 15° C., 225 psi, 2000 ppm sodium chloride solution). The NaAlg/PVA membrane crosslinked with calcium ions according to the related art has been studied for the purpose of permeation/evaporation-based separation of a water/alcohol mixture, but has never been applied to nanofiltration. However, glutaraldehyde (GA) is used more frequently for the purpose of improvement of the density of a membrane. Thus, the inventors of the present disclosure have reported about a NaAlg/PVA composite membrane crosslinked with GA. However, the membrane shows an insufficient water permeation flux and salt rejection characteristics (see, Reference a, c and d of Table 1).

Therefore, in order to examine the effect of reaction time for primary crosslinking, a NaAlg/PVA composite membrane is coated onto a polysulfone support and dipped into 5 wt % $CaCl_2$ solution for a different period of time. Then, 2000 ppm NaCl is used as feed to determine water permeation fluxes and salt rejection ratios. The membrane crosslinked primarily with $Ca^{2+}$ has a high water permeation flux but a low salt rejection ratio, and thus secondary crosslinking is carried out to control the permeability of a NaAlg/PVA composite membrane. The reaction time for primary crosslinking is 10-220 minutes, and the primarily crosslinked NaAlg/PVA composite membrane is dipped into 5 wt % aqueous glutaraldehyde solution for 20 minutes. The primary and secondary crosslinking agents are used in an excessive amount so that the highest crosslinking density may be obtained. Then, contact angles are measured for the mono ($Ca^{2+}$) and double ($Ca^{2+}$ and GA) crosslinked NaAlg/PVA composite membranes to carry out comparison in terms of hydrophilicity. The contact angles of the NaAlg/PVA composite membrane mono-crosslinked with $Ca^{2+}$ and the NaAlg/PVA composite membrane double crosslinked with $Ca^{2+}$ and GA are 63.32° and 55.36°, respectively. This suggests that the double crosslinked NaAlg/PVA composite membrane having a smaller contact angle shows higher hydrophilicity.

In addition, the salt rejection ratio increases exponentially and the water permeation flux decreases exponentially when using 2000 ppm NaCl solution. However, 120 minutes after the primary crosslinking, the salt rejection ratio is nearly constant and the water permeation flux decreases slightly. It is thought that sodium alginate reacts rapidly with $Ca^{2+}$ (substitution of $Na^+$ with $Ca^{2+}$) to form a very dense gel-like network. Then, the hydroxyl groups of PVA are crosslinked with glutaraldehyde. As a result, it seems that the crosslinking degree increases as the crosslinking time increases but crosslinking does not proceed any longer after the crosslinking degree reaches the maximum in a predetermined time.

Meanwhile, FIG. 7A is a graph illustrating the water permeation flux characteristics of the double crosslinked sodium alginate/polyvinyl alcohol composite nanofiltration membrane according to Example 1 for various salt solutions as a function of operating time (operation conditions: 15° C., 225 psi), while FIG. 7B is a graph illustrating the salt rejection characteristics of the double crosslinked sodium alginate/polyvinyl alcohol composite nanofiltration membrane according to Example 1 for various salt solutions as a function of operating time (operation conditions: 15° C., 225 psi). In general, it is required that a high-quality membrane not only has excellent filtering characteristics but also retains stable quality even after the lapse of time. The size and properties of ion species present in feed significantly affect the permeability of a membrane with time. Thus, in order to determine the effect of operating time upon the water permeation flux and salt rejection ratio of a membrane, three types of salt solutions each containing 2000 ppm of salt are used to carry out a test. As shown in FIGS. 7A and 7B, both the water permeation flux and salt rejection ratio vary with time. The water permeation flux slightly decreases with time for all types of feed solutions. It is thought that this results from the accumulation of charged materials on the surface of a membrane. The water permeation flux of salt solutions is in order of $NaCl>Na_2SO_4>MgSO_4$. It can be seen that the water permeation flux depends on the size of hydrated ions. As the size of hydrated ions increase, the water permeation flux is low. It is thought that this is because the pores of a membrane are blocked partially with time. On the contrary, the results of salt rejection characteristics are opposite to the results of water permeation flux. A large hydrated ion ($MgSO_4$) has a high salt rejection ratio, while a small ion has a low salt rejection ratio.

Figure 8:
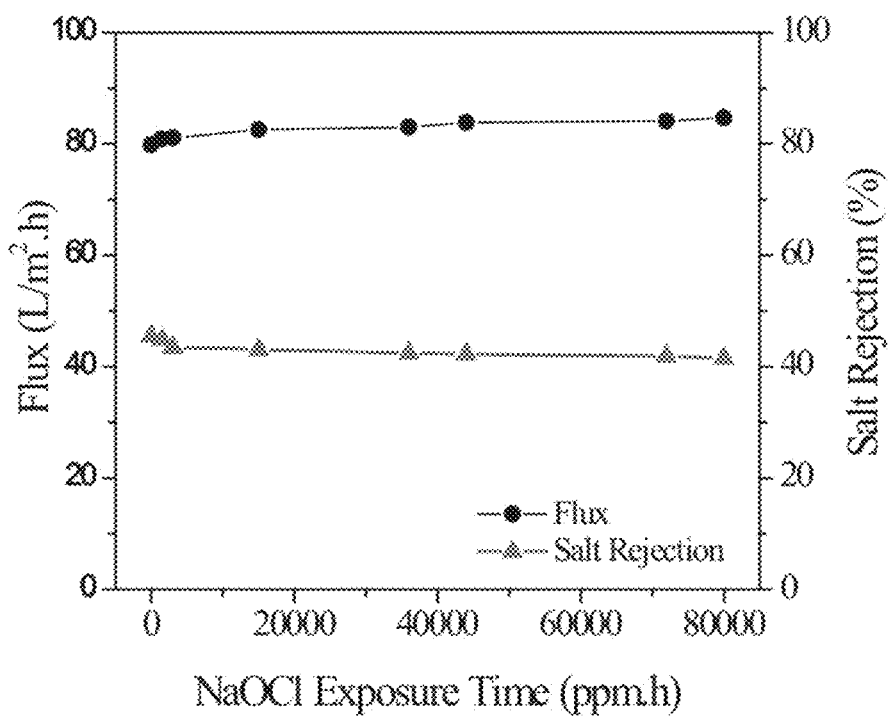
FIG. 8 is a graph illustrating the water permeation flux and salt rejection characteristics of the double crosslinked sodium alginate/polyvinyl alcohol composite nanofiltration membrane according to Example 1 as a function of time of exposure to chlorine environment (feed: 15° C., 225 psi, 2000 ppm sodium chloride solution).

In addition, FIG. 8 is a graph illustrating the water permeation flux and salt rejection characteristics of the double crosslinked sodium alginate/polyvinyl alcohol composite nanofiltration membrane according to Example 1 as a function of time of exposure to chlorine environment (feed: 15° C., 225 psi, 2000 ppm sodium chloride solution). In general, a commercialized polyamide membrane is attacked by chlorine. It is known that chlorine resistance is an important durability-related factor. Therefore, the double crosslinked sodium alginate/polyvinyl alcohol composite nanofiltration membrane according to Example 1 is exposed to 300 ppm sodium hypochlorite (NaOCl) for different periods of time, and then filtering characteristics are tested to determine chemical stability. As shown in FIG. 8, the double crosslinked sodium alginate/polyvinyl alcohol composite nanofiltration membrane according to Example 1 is stable even after it is exposed to high-chlorine environment for a long time. The water permeation flux decreases slightly and thus the salt rejection ratio also decreases slightly. However, the double crosslinked sodium alginate/polyvinyl alcohol composite nanofiltration membrane maintains excellent chlorine resistance and is chemically stable.

Therefore, the double crosslinked sodium alginate/polyvinyl alcohol composite nanofiltration membrane disclosed herein not only shows excellent chlorine resistance but also has improved water permeation flux and salt rejection ratio, and thus may be manufactured in the form of a spirally wound type membrane module and applied to a water treatment system in which it may be utilized for an actual nanofiltration separation process.

What is claimed is:

1. A double crosslinked sodium alginate/polyvinyl alcohol composite nanofiltration membrane, comprising:
   a porous polymer support; and
   a sodium alginate/polyvinyl alcohol blend coating layer formed on the porous polymer support and having a first crosslinking structure formed by complexation with divalent metal ions and a second crosslinking structure formed by acetalization with aldehyde groups;
   wherein the porous polymer support may be any one selected from the group consisting of polysulfone, polyethersulfone, polyacrylonitrile, polyamide, polyimide, polyetherimide, polyetherether ketone, polyvinylidene fluoride, cellulose acetate and cellulose triacetate.

2. The double crosslinked sodium alginate/polyvinyl alcohol composite nanofiltration membrane according to claim 1, wherein the divalent metal ion may be any one selected from the group consisting of $Ca^{2+}$, $Mg^{2+}$, $Cu^{2+}$, $Zn^{2+}$, $Fe^{2+}$, $Mn^{2+}$, $Co^{2+}$, $Ni^{2+}$, $Sn^{2+}$ and $Ti^{2+}$.

3. The double crosslinked sodium alginate/polyvinyl alcohol composite nanofiltration membrane according to claim 1, wherein the sodium alginate/polyvinyl alcohol blend comprises 20-90 wt % of sodium alginate and 10-80 wt % of polyvinyl alcohol.

4. The double crosslinked sodium alginate/polyvinyl alcohol composite nanofiltration membrane according to claim 1, wherein the coating layer of sodium alginate/polyvinyl alcohol blend has a thickness of 0.85-1 μm.

5. A method for preparing a double crosslinked sodium alginate/polyvinyl alcohol composite nanofiltration membrane of claim 1, comprising the steps of:
   I) coating a porous polymer support with an aqueous solution of sodium alginate/polyvinyl alcohol to form a composite membrane on the support;
   II) dipping the resultant composite membrane into a solution containing divalent metal ions to carry out primary crosslinking; and
   III) washing the primarily crosslinked composite membrane, and then dipping it into an aqueous glutaraldehyde solution to carry out secondary crosslinking;
   wherein the porous polymer support may be any one selected from the group consisting of polysulfone, polyethersulfone, polyacrylonitrile, polyamide, polyimide, polyetherimide, polyetherether ketone, polyvinylidene fluoride, cellulose acetate and cellulose triacetate.

6. The method for preparing a double crosslinked sodium alginate/polyvinyl alcohol composite nanofiltration membrane according to claim 5, wherein the aqueous solution of sodium alginate/polyvinyl alcohol blend has a concentration of 0.1-0.5 wt %.

7. The method for preparing a double crosslinked sodium alginate/polyvinyl alcohol composite nanofiltration membrane according to claim 5, wherein the primary crosslinking is carried out for 10-220 minutes.

8. A spirally wound type membrane module comprising the double crosslinked sodium alginate/polyvinyl alcohol composite nanofiltration membrane as defined in claim 1.

9. A water treatment system comprising the spirally wound type membrane module as defined in claim 8.

10. A double crosslinked sodium alginate/polyvinyl alcohol composite nanofiltration membrane, comprising:
    a porous polymer support; and
    a sodium alginate/polyvinyl alcohol blend coating layer formed on the porous polymer support and having a first crosslinking structure formed by complexation with divalent metal ions and a second crosslinking structure formed by acetalization with aldehyde groups;
    wherein the sodium alginate/polyvinyl alcohol blend comprises 20-90 wt % of sodium alginate and 10-80 wt % of polyvinyl alcohol.

11. The double crosslinked sodium alginate/polyvinyl alcohol composite nanofiltration membrane according to claim 10, wherein the divalent metal ion may be any one selected from the group consisting of $Ca^{2+}$, $Mg^{2+}$, $Cu^{2+}$, $Zn^{2+}$, $Fe^{2+}$, $Mn^{2+}$, $Co^{2+}$, $Ni^{2+}$, $Sn^{2+}$ and $Ti^{2+}$.

12. The double crosslinked sodium alginate/polyvinyl alcohol composite nanofiltration membrane according to claim 10, wherein the coating layer of sodium alginate/polyvinyl alcohol blend has a thickness of 0.85-1 μm.

13. A method for preparing a double crosslinked sodium alginate/polyvinyl alcohol composite nanofiltration membrane of claim 10, comprising the steps of:
I) coating a porous polymer support with an aqueous solution of sodium alginate/polyvinyl alcohol to form a composite membrane on the support;
II) dipping the resultant composite membrane into a solution containing divalent metal ions to carry out primary crosslinking; and
III) washing the primarily crosslinked composite membrane, and then dipping it into an aqueous glutaraldehyde solution to carry out secondary crosslinking;
wherein the sodium alginate/polyvinyl alcohol blend comprises 20-90 wt % of sodium alginate and 10-80 wt % of polyvinyl alcohol.

14. The method for preparing a double crosslinked sodium alginate/polyvinyl alcohol composite nanofiltration membrane according to claim 13, wherein the aqueous solution of sodium alginate/polyvinyl alcohol blend has a concentration of 0.1-0.5 wt %.

15. The method for preparing a double crosslinked sodium alginate/polyvinyl alcohol composite nanofiltration membrane according to claim 13, wherein the primary crosslinking is carried out for 10-220 minutes.

16. A spirally wound type membrane module comprising the double crosslinked sodium alginate/polyvinyl alcohol composite nanofiltration membrane as defined in claim 10.

17. A water treatment system comprising the spirally wound type membrane module as defined in claim 16.

18. A double crosslinked sodium alginate/polyvinyl alcohol composite nanofiltration membrane, comprising:
a porous polymer support; and
a sodium alginate/polyvinyl alcohol blend coating layer formed on the porous polymer support and having a first crosslinking structure formed by complexation with divalent metal ions and a second crosslinking structure formed by acetalization with aldehyde groups;
wherein the coating layer of sodium alginate/polyvinyl alcohol blend has a thickness of 0.85-1 μm.

19. The double crosslinked sodium alginate/polyvinyl alcohol composite nanofiltration membrane according to claim 18, wherein the divalent metal ion may be any one selected from the group consisting of $Ca^{2+}$, $Mg^{2+}$, $Cu^{2+}$, $Zn^{2+}$, $Fe^{2+}$, $Mn^{2+}$, $Co^{2+}$, $Ni^{2+}$, $Sn^{2+}$ and $Ti^{2+}$.

20. The double crosslinked sodium alginate/polyvinyl alcohol composite nanofiltration membrane according to claim 18, wherein the sodium alginate/polyvinyl alcohol blend comprises 20-90 wt % of sodium alginate and 10-80 wt % of polyvinyl alcohol.

* * * * *